US012172190B2

(12) United States Patent
Hausladen et al.

(10) Patent No.: US 12,172,190 B2
(45) Date of Patent: Dec. 24, 2024

(54) VIBRATION GENERATOR AND CONSTRUCTION MACHINE HAVING SUCH A VIBRATION GENERATOR

(71) Applicant: Liebherr-Components Biberach GmbH, Biberach an der Riss (DE)

(72) Inventors: Norbert Hausladen, Biberach an der Riss (DE); Viktor Schindler, Uttenweiler (DE); Christian Sprenger, Ravensburg (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 446 days.

(21) Appl. No.: 17/454,034

(22) Filed: Nov. 8, 2021

(65) Prior Publication Data

US 2022/0055070 A1 Feb. 24, 2022

Related U.S. Application Data

(63) Continuation of application No. PCT/EP2020/060442, filed on Apr. 14, 2020.

(30) Foreign Application Priority Data

May 8, 2019 (DE) ..................... 10 2019 111 935.9
May 24, 2019 (DE) ..................... 10 2019 113 947.3

(51) Int. Cl.

*B06B 1/16* (2006.01)
*E01C 19/28* (2006.01)
*E02D 7/18* (2006.01)

(52) U.S. Cl.

CPC .............. *B06B 1/166* (2013.01); *B06B 1/167* (2013.01); *E01C 19/286* (2013.01); *E02D 7/18* (2013.01)

(58) Field of Classification Search

CPC ... Y10T 74/18344; E02D 7/18; E01C 19/286; B06B 1/167; B06B 1/166
See application file for complete search history.

(56) References Cited

U.S. PATENT DOCUMENTS 4,211,121 A * 7/1980 Brown .................... B06B 1/162 366/116
4,471,666 A 9/1984 Unrath et al.
(Continued)

FOREIGN PATENT DOCUMENTS

CN 103243630 8/2013
CN 104285011 1/2015
(Continued)

*Primary Examiner* — Gregory Robert Weber
(74) *Attorney, Agent, or Firm* — Levine Bagade Han LLP

(57) ABSTRACT

The invention relates to a vibration generator for piling machines, compactors or other construction machines, having at least two unbalance trains, each comprising unbalanced masses which are rotatingly drivable by a drive apparatus, and an adjustment apparatus for adjusting the phase position of the rotating unbalanced masses relative to each other. According to the invention, the unbalanced masses of different unbalance trains are arranged coaxially without a fixed transmission ratio relative to each other, wherein the unbalanced masses of a first unbalance train are arranged between the unbalanced masses, coaxial therewith, of a second unbalance train, and the drive apparatus is designed to drive the unbalance trains with rotation speed differences which are variable relative to each other.

20 Claims, 4 Drawing Sheets

(56) References Cited

U.S. PATENT DOCUMENTS

| | | | | |
|---|---|---|---|---|
| 11,623,249 | B2 * | 4/2023 | Kato | B07B 1/44 209/326 |
| 2009/0243410 | A1 | 10/2009 | Kleibl et al. | |
| 2014/0305234 | A1 | 10/2014 | Kleibl et al. | |
| 2017/0333947 | A1 * | 11/2017 | Hausladen | E02D 7/18 |

FOREIGN PATENT DOCUMENTS

| | | | | |
|---|---|---|---|---|
| CN | 104695310 | | 6/2015 | |
| CN | 107427863 | | 12/2017 | |
| CN | 108348960 | | 7/2018 | |
| DE | 2932287 | | 2/1981 | |
| DE | 19529115 | | 3/1997 | |
| DE | 19631991 | | 2/2005 | |
| EP | 2105214 | | 9/2009 | |
| EP | 2158976 | | 3/2010 | |
| EP | 2789402 | | 10/2014 | |
| EP | 3165290 | | 5/2017 | |
| EP | 3165290 | A1 * | 5/2017 | B06B 1/166 |
| JP | S56-28932 | | 3/1981 | |
| WO | WO 2016/128136 | | 8/2016 | |
| WO | WO 2020/224918 | | 11/2020 | |

* cited by examiner

VIBRATION GENERATOR AND CONSTRUCTION MACHINE HAVING SUCH A VIBRATION GENERATOR

CROSS-REFERENCE TO RELATED APPLICATIONS

This application is a continuation of International Patent Application Number PCT/EP2020/060442 filed Apr. 14, 2020, which claims priority to German Patent Application Numbers DE 10 2019 111 935.9 filed May 8, 2019 and DE 10 2019 113 947.3 filed May 24, 2019, all of which are incorporated herein by reference in their entireties.

BACKGROUND

The invention relates to a vibration generator for piling machines, compactors or other construction machines, having at least two unbalance trains, each comprising unbalanced masses which are rotatingly drivable by a drive apparatus, and an adjustment apparatus for adjusting the phase position of the rotating unbalanced masses relative to each other.

Such vibration generators, sometimes referred to as vibrators, can, for example, be used in the construction industry for piling machines or for compactors to generate directed vibrations by means of which, for example, sheet pile walls can be rammed into the ground, vibro stone columns can be introduced into the ground or the ground can be compacted or leveled. The ground can optionally also be prepared to facilitate the piling in or pulling out of sheet piles or other construction elements such as posts and the like. The exciter cell of such vibrators that generates vibrations can in this respect be attached to a movable pull yoke of a special underground machine such as drills and/or piling machines, guide poles or cable excavators by means of which the vibrator unit is typically travelable in a perpendicular direction.

To generate primarily vertical vibrations or at least vibrations acting in a perpendicular direction, a plurality of shafts or wheels can be received in the exciter cell that revolve around parallel, horizontal oriented axes and support unbalanced masses that generate accelerations and thus the desired vibrations by corresponding centrifugal forces during the revolution movement. In this respect the unbalanced masses are usually split over a plurality of wheels and/or shafts and are coordinated with one another with respect to their arrangement, direction of rotation and phase position such that forces are compensated where possible in the horizontal or lying direction.

By means of a mechanical adjustment apparatus, the forces of two unbalance trains can be synchronized or neutralized as required. According to WO 2016/128136 A1, such an adjustment apparatus may comprise a planetary gearing comprising two output trains which may be adjusted relative to each other by an adjustable input train to which, for example, an actuating cylinder may be connected, so that unbalanced masses connected to the output trains of the planetary gearing are also adjusted in their phase position in order to synchronize or neutralize their forces.

The forces of the unbalanced masses can be described in their course by a sinusoidal form, from which it follows that the resulting force of the vibrator is also sinusoidal. Thus, the magnitude of the force in the negative and positive directions is the same. This has the disadvantage that, on the one hand, the ground, whose fundamental frequency is also sinusoidal, can no longer be put into a pseudo-liquid state by the exciter cell after a certain point. On the other hand, an additional force must be applied to drive the pile element into the ground.

To remedy this situation, it is advantageous if the superposition of the forces of the various unbalance trains can be varied by means of a variably adjustable phase shift in order to be able to affect the stimulation of the soil. In particular, it may be advantageous if a sinusoidal vibration can be superimposed with a cosinusoidal vibration, which makes it easier to bring the soil into a pseudofluid state. If the phase shift of the forces can be variably adjusted, the vibration characteristic of the vibrator or the exciter cell can be adapted to the individual case and matched to the respective soil.

EP 21 58 976 B1 describes such a vibration generator in which the phase shift between the unbalanced masses can be changed in operation. The vibration generator comprises a plurality of shaft groups with unbalanced masses attached to them, which are arranged above or below each other so that the vertical forces can be added and/or compensated. In this case, one shaft group can be driven at a speed which is an integral multiple of the speed of the other shaft group, the phase shifter comprising, for adjusting the phase offset, a rotary vane swivel motor whose swivel motor shaft is connected to an unbalance group and whose swivel motor housing is connected to another shaft group, in order to change the phase position by changing the rotational position of the swivel motor housing relative to the swivel motor shaft.

However, this previously known vibration generator is relatively bulky in terms of its size and tends to generate unwanted lateral forces or wobbling movements if an unfavorable phase offset is set. In addition, it is not easy to move the rotary vane swivel motor to the desired rotary position and to maintain it there.

SUMMARY

It is the underlying object of the present invention to provide an improved vibration generator of the initially named kind which avoids disadvantages of the prior art and further develops the latter in an advantageous manner. In particular, any phase adjustment should be easily adjustable in a compact design in order to be able to adapt the oscillation values to different soil conditions.

Said task is solved, according to the invention, with a vibration generator as claimed in claim 1 and a construction machine as claimed in claim 19. Preferred embodiments of the invention are the subject-matter of the dependent claims.

It is thus proposed that the unbalance groups rotating at different speeds are no longer or not only stacked one above the other and one below the other, but also arranged coaxially with respect to one another, so that unbalanced masses running at different speeds and/or directions of rotation rotate on the same axis. According to the invention, the unbalanced masses of different unbalance trains are arranged coaxially without a fixed transmission ratio relative to each other, wherein the unbalanced masses of a first unbalance train are arranged between the unbalanced masses, coaxial therewith, of a second unbalance train, and the drive apparatus is designed to drive the unbalance trains with rotation speed differences which are variable relative to each other. Despite being arranged on the same axis, coaxial unbalanced masses can revolve at different speeds and their speeds can be changed relative to each other. Due to the arrangement of the first unbalance train enclosed on both sides between the coaxial unbalanced masses of the second drive train, not only a compact size is achieved, but also an improved balance of the unbalanced masses is achieved, so that the vibration generator remains balanced even with different phase shifts.

In particular, by splitting the second unbalance train into two sub-trains and/or train branches flanking the first unbalance train on the right and left, it is possible to operate only one of said unbalance trains while the other unbalance train is immobilized without unbalancing the exciter cell. Similarly, the speed difference between the unbalanced masses of the first unbalance train and the unbalanced masses of the second unbalance train can be varied as desired in order to adapt the characteristic curve of the vibration generator to the respective soil conditions, wherein the exciter cell as a whole remains in equilibrium regardless of the speed difference set in each case.

In particular, the speed set for one unbalance group or one unbalance train may be a multiple of the speed of the other unbalance train. In particular, the speed ratio can also be set in such a way that one unbalance train generates a sinusoidal vibration and the other unbalance train generates a cosinusoidal vibration, which are superimposed on each other.

In a further embodiment of the invention, the first unbalance train, whose unbalanced masses are arranged between the unbalanced masses of the second unbalance train arranged coaxially thereto, may itself also be split into two sub-trains or branches of the train and comprise unbalanced masses arranged side by side in pairs, both of which are each arranged between the unbalanced masses of the second drive train.

Thus, in further development of the invention, in particular four unbalanced masses can be arranged coaxially with respect to each other, two of which belong to a first unbalance train and two of which belong to a second unbalance train, said first and second unbalance trains can be driven at mutually different speeds.

In such a coaxial arrangement of at least four unbalanced masses, said four coaxial unbalanced masses can each be driven in pairs at the same speeds, wherein the two inner unbalanced masses can be driven at the same speed and the two outer unbalanced masses can be driven at the same speed, wherein the speed of the outer unbalanced masses can advantageously be varied as desired, in particular continuously, relative to the speed of the two inner unbalanced masses, in order to be able to set different phase offsets. The outer unbalanced masses may rotate at a speed equal to the speed of the inner unbalanced masses or a multiple of the speed of the inner unbalanced masses or a fraction of the speed of the inner unbalanced masses.

Alternatively to such a pairwise adjustment of the speeds, however, it is also possible in further development of the invention to drive each of the four unbalanced masses with its own speed. In particular, the speed of the two outer unbalanced masses may also be varied relative to each other and/or the speed of the inner unbalanced masses may be varied relative to each other so that, for example, one inner unbalanced mass revolves faster than the other inner unbalanced mass, and/or alternatively one of the outer unbalanced masses revolves faster than the other outer unbalanced mass.

In this case, said planetary gearing can be omitted and the unbalanced mass can be adjusted by the drive motors, the speeds of which can be adjusted and/or controlled. A regulation apparatus and/or a controller can control said drive motors and adjust their speeds to each other in a desired manner. A forced coupling between the unbalanced masses and their speeds, in particular in the form of a gear stage of a mechanical forced coupling stage, can be omitted. For example, a gear ratio of −1 can be provided between the output shafts.

In order to be able to vary the speeds of the unbalance trains relative to each other, the drive apparatus may comprise separate drive motors for the different unbalance trains, which may be individually controlled by a control apparatus in order to be able to set the desired speed difference. In particular, at least three, preferably four, drive motors may be provided, each drive motor driving an associated unbalance train or train branch of unbalanced masses. In further embodiments of the invention, two drive motors may be provided, each drive motor driving one of the train branches of the first unbalance train and one of the outer train branches of said second unbalance train. Alternatively or additionally, two drive motors may be provided, each of which drives one of the train branches of said first unbalance train positioned centrally or between the unbalanced masses of the second unbalance train and one train branch of the further unbalance train.

Advantageously, at least one drive can be provided in both trains, wherein the trains can be connected to one another and/or coupled in such a way that they have the same speed by means of a gear or a coupling, in particular said planetary gearing. Said strands also function independently of each other except for the adjustment.

Advantageously, the control apparatus for controlling the drive motors may comprise an adjustable speed difference sensor for variably setting different rotation speed differences between the unbalance trains. By means of such a speed difference sensor it is possible in a simple way to vary the rotation speed differences between the unbalance trains in order to be able to adapt the vibration characteristic curve to the soil conditions.

In particular, said control apparatus may comprise speed controllers for controlling the speeds of the various drive motors and thus the speeds of the unbalance trains as a function of a sensed actual speed and a variably definable target speed.

Alternatively or in addition to said adjustment of the rotation speed differences by individual control and/or regulation of the speeds, a desired rotation speed differences can also be variably adjusted by braking at least one of the unbalance groups by a braking device. For this purpose, the drive apparatus may comprise a braking device for braking at least one of the unbalance trains, preferably for braking both, i.e. said first and second unbalance trains, in order to generate a desired phase offset. In order to allow one unbalance group to revolve behind the other unbalance group with a certain phase offset, said unbalance group can be braked a little by the braking device.

Advantageously, each of the two unbalance trains can be braked independently of each other in order to be able to adjust the phase shift differently, in particular to regulate it. Said braking device may comprise two braking units, each of which is arranged in a fixed position on the one hand and is rotationally connected to one of the unbalance trains on the other hand.

Advantageously, in further embodiments of the invention, each of the unbalance trains may be associated with a speed sensor which senses the actual speed of the respective unbalanced masses and/or the drive shafts or wheels associated therewith and feeds back to the control apparatus so that the control apparatus can control the drive motors accordingly and/or actuate the braking device accordingly to enable the desired speed and/or phase offset to be set.

In a further embodiment of the invention, the mechanical adjustment device for adjusting the phase position of the unbalanced masses relative to one another can comprise planetary gearing, which is advantageously designed with at least two stages in order to be able to adjust the phase position of the unbalanced masses of one unbalance train with one planetary stage and the phase position of the unbalanced masses of the other unbalance train with the other planetary stage.

In particular, in further embodiments of the invention, said planetary gearing may comprise at least four output trains and an adjustment input train for adjusting the phase position of the output trains relative to each other. Advantageously, the relatively phase-adjustable unbalanced masses of the first unbalance train can be connected to two of said four output trains and the relatively phase-adjustable unbalanced masses of the second unbalance train can be connected to two further output trains of the planetary gearing.

In further embodiments of the invention, said four output trains may extend from a common, two-stage planet carrier connected to and adjustable by said adjustment input train.

The mutually phase-adjustable unbalanced masses of the said first unbalance train can advantageously be connected on the one hand to a sun gear and on the other hand to a ring gear of a first planetary gear stage, while the mutually phase-adjustable unbalanced masses of the said second unbalance train can be connected on the one hand to a sun gear and on the other hand to a ring gear of a second planetary gear stage. In an advantageous further embodiment of the invention, the two planetary gear stages can be connected by the common, two-stage and adjustable planetary carrier, so that by adjusting said planetary carrier both the phase position of the unbalanced masses of the first unbalance train and the phase position of the unbalanced masses of the second unbalance train can be adjusted.

Advantageously, each stage of said common planet carrier is connected to only one unbalance train.

Said adjustment input train of the planetary gearing can be actuated by a suitable adjustment drive, for example moved back and forth between two end positions by a pressure medium cylinder. Advantageously, the two end positions can be defined or limited by stops in such a way that in a first position the unbalanced masses revolve synchronously with each other and generate forces in the same direction, while in a second end position the unbalanced masses compensate each other. If necessary, intermediate positions can also be set by the adjustment drive in order to be able to set different strengths of the vibrations.

In order to achieve a compact arrangement, said planetary gearing may be arranged on one side of the unbalance trains, while the drive motors for driving the rotating unbalanced masses may be arranged on a common side of the unbalance trains opposite to the planetary gearing. If four drive motors are provided in the said manner, two drive motors may be arranged on one side and two other drive motors may be arranged on an opposite side of a center plane, which center plane may include the axis of rotation of said planet carrier of the planetary gearing.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 3:
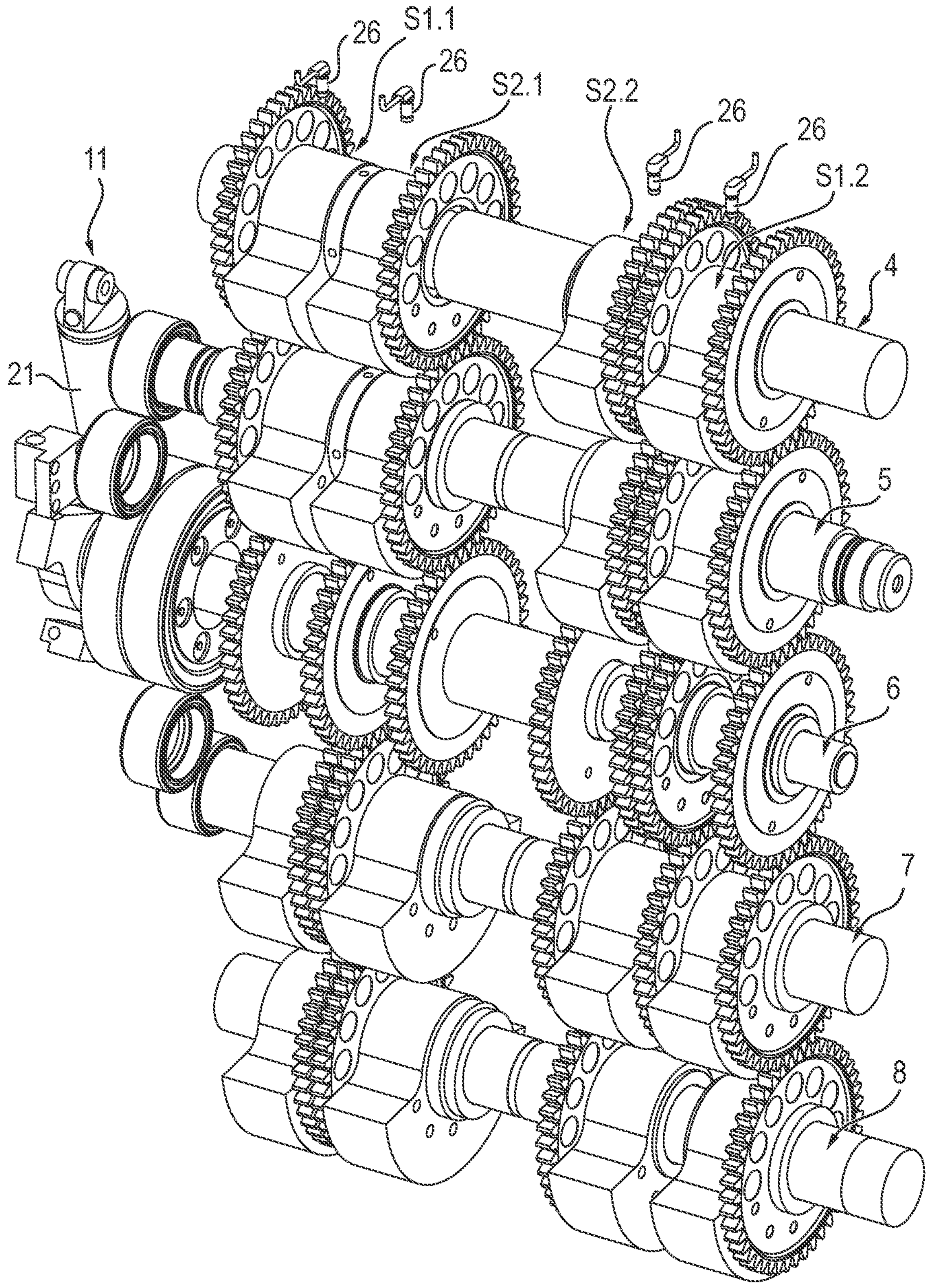

As the figures shows, the vibration generator 10 can have an exciter cell 20 having a plurality of exciter cell shafts and/or exciter cell axes that are aligned in parallel and respectively horizontally, that are received in an exciter cell housing 3 and are rotatably supported. Said exciter cell shafts are advantageously arranged one above the other in a common, upright plane, cf. FIG. 3 and FIG. 4.

In this case, several unbalanced masses are arranged on at least some of said exciter cell shafts or axes, which revolve about the respective axes. Preferably, all exciter cell shafts or axles, with the exception of one exciter cell shaft 6 which serves to set the phase position, carry unbalanced masses, wherein said exciter cell shaft 6 without unbalanced masses can advantageously be arranged centrally and can be in rolling engagement with at least two adjacent exciter cell shafts 5 and 7 by means of spur gears.

Advantageously, each of the exciter cell shafts 4, 5 and 7, 8 may carry at least four unbalanced masses 1.1, 1.2, 2.2 and 2.1 respectively, so that four unbalanced masses are arranged coaxially with each other. Each unbalance 1.1, 1.2, 2.2 and 2.1 is connected in a rotationally fixed manner to a spur gear which is also mounted on the respective exciter cell shaft 2 and is in rolling engagement with a spur gear on the next adjacent exciter cell shaft, in order to form a plurality of unbalance trains S1.2, S2.2, S2.1 and S.1.1, the unbalanced masses of which are each driven together and/or driven at a predetermined speed and/or at a predetermined ratio of transmission/reduction.

The respective four or more unbalanced masses 1.1, 1.2, 2.1 and 2.2 arranged coaxially to one another on an exciter cell shaft 4, 5, 7 or 8 are in each case arranged without a fixed transmission ratio and can accordingly be driven at different speeds, i.e. speeds which differ relatively from one another, it being possible in particular to provide that one unbalance train can revolve at a speed which can be a multiple of the speed of another unbalance train. For example, the two speed trains S1.1 and S1.2 can revolve at twice the speed of the unbalance train 2.1 and 2.2, wherein other speed ratios can also be set by adjusting or changing the speeds.

In this case, all unbalanced masses 1.1, 1.2, 2.1 and 2.2, which are located coaxially on the same axes, can be rotatable relative to the respective axis and can only be connected to the respective spur gear 9 in a rotationally fixed manner. Alternatively, one of the spur gears or one of the unbalanced masses can also be connected to the respective exciter cell shaft 4, 5, 7 or 8 in a rotationally fixed manner in order to simplify the driving or the connection of the drive motor.

Figure 1:
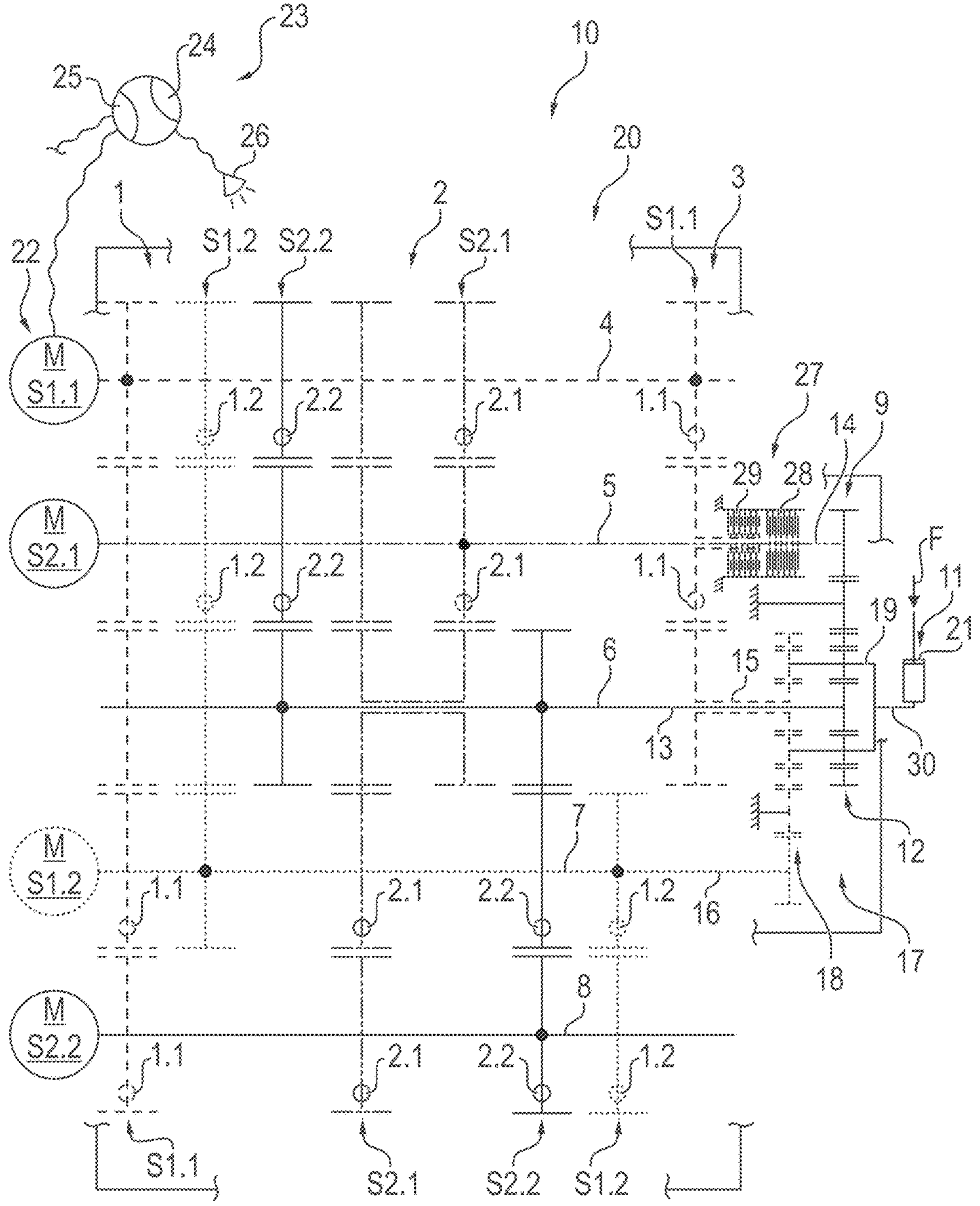
FIG. 1: a drive circuit diagram of the vibration generator according to an advantageous embodiment of the invention, showing the coaxial arrangement of the unbalanced masses of different unbalance trains, the connection of the unbalance trains to planetary gearing for adjusting the phase position of the unbalanced masses, the arrangement of the drive motors and the arrangement of a braking device for adjusting a phase offset.

As shown in FIG. 1, advantageously four drive motors MS1.1, MS2.1, MS1.2 and MS2.2 can be provided, each of which is assigned to one of the unbalance trains and can be controlled independently of one another. In this case, the motor MS1.1 drives all the unbalanced masses or the spur gears of the unbalance train S1.1 which are connected thereto in a rotationally fixed manner, wherein the rotational movement of said motor is introduced into the exciter cell shaft 4 and can then be transmitted to the unbalanced masses of the unbalanced masses mounted on the other exciter cell shafts or axles via the spur gears 9 which are in rolling engagement with one another. The drive motor MS2.1 drives the unbalanced masses of the unbalance train S2.1, wherein said motor MS2.1 may be coupled to the exciter cell shaft 5.

The drive motor MS1.2 can drive the exciter cell shaft 7, which drives the unbalanced masses 1.2 of the unbalance train S1.2 via the corresponding spur gears 9. Finally, the further drive motor MS2.2 may be arranged on the fourth unbalance shaft 8 and drive the unbalanced masses 2.2 of the unbalance train S2.2, cf. FIG. 1.

As FIG. 1 shows, the two trains branches S2.2 and S2.1, which belong to a first unbalance train 2, are arranged centrally between the train branches S1.1 and S1.2, which belong to a second unbalance train 1. The unbalanced masses 2.1 and 2.2 of said branches of the first unbalance train 2 are arranged between the unbalanced masses 1.1 and 1.2 of the second unbalance train 1, which are coaxial to them. This is true for each of the exciter cell shaft 4, 5, 7, and 8, each of which carries unbalanced masses.

In order to be able to adjust the phase position of the mutually adjustable unbalanced masses of the respective unbalance trains relative to each other, the adjustment apparatus 11 is provided, which may comprise a planetary gearing 12, cf. FIG. 1.

Advantageously, said planetary gearing 12 may comprise at least four output trains 13, 14 and 15, 16, each of which is coupled to one of the exciter cell shafts 4, 5, 7, 8, respectively, or to one of the unbalance trains 1 and 2, respectively, or to one of the train branches S1.1, S1.2, S2.1 and S2.2, respectively, so that the phase position of the unbalance trains or trains branches 1.1, 1.2, 2.1 and 2.2, respectively, can be adjusted relative to each other by relative rotation of said output trains 13, 14, 15, 16 relative to each other.

Figure 2:
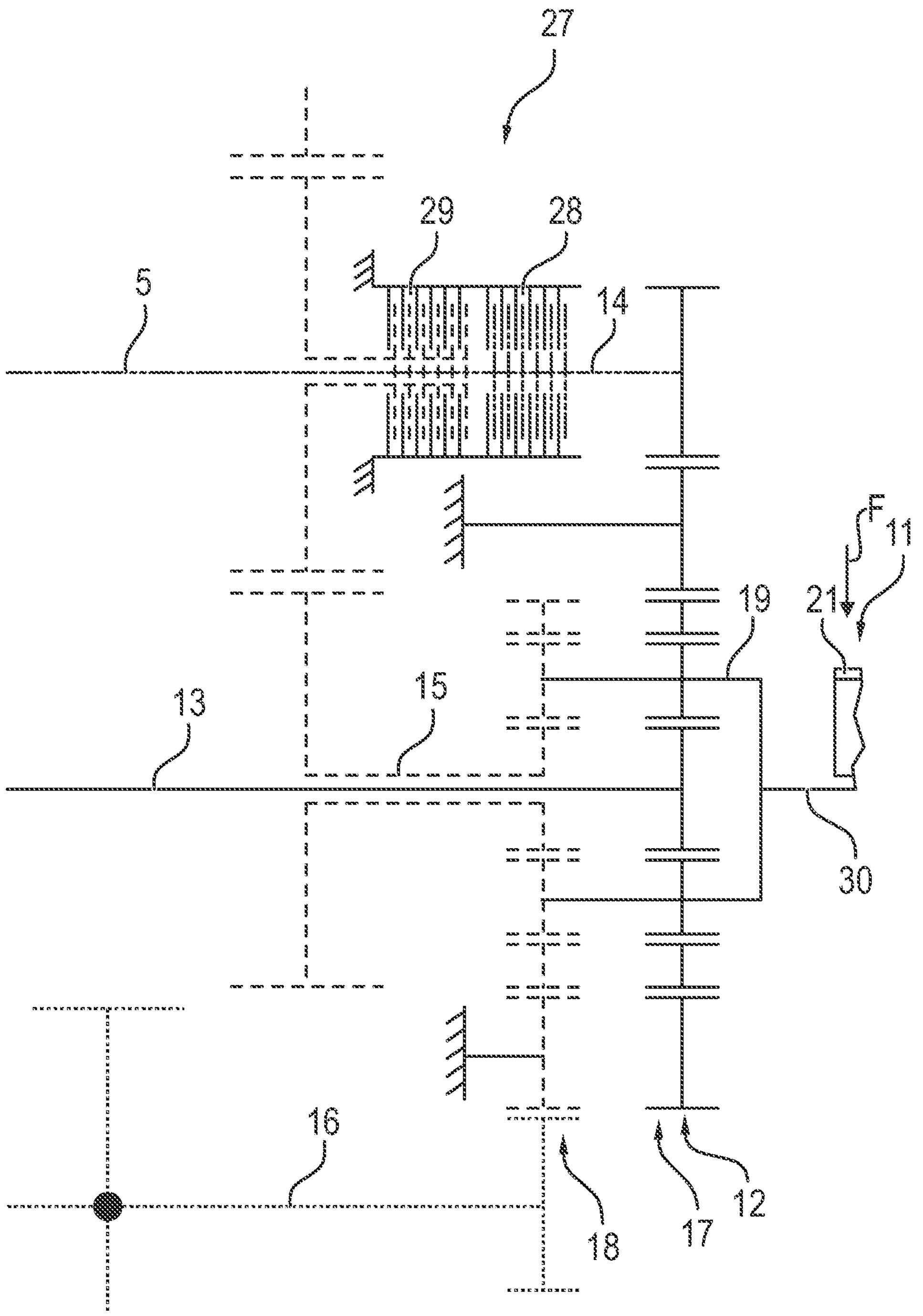
FIG. 2: a detail enlarged view of the planetary gearing and the braking device of the vibration generator of FIG. 1, FIG. 3: a perspective front view of the unbalanced masses of the various unbalance trains of the vibration generator of the preceding figures, showing the planetary gearing and the shafts or gears adjustable by the planetary gearing with which the driving wheels of the unbalanced masses mesh.

As shown in FIGS. 1 and 2, said planetary gearing 12 may advantageously comprise two planetary gear stages 17 and 18, a first planetary gear stage 17 of which is coupled on the output side to the trains branches S2.2 and S2.1 of the first unbalance train 2. Meanwhile, a second planetary gear stage 18 is coupled to the output side of the train branches S1.1 and S1.2 of the second unbalance train 1.

Advantageously, the two planetary gear stages 17 and 18 may be interconnected by a common, two-stage planet carrier 19 which carries the planet gears of both the first planetary gear stage 17 and the planet gears of the second planetary gear stage 18.

The output trains 13 and 14 of the first planetary gear stage 17 can be formed on the one hand by its sun gear and on the other hand by its ring gear, or can be connected to its sun gear and its ring gear. The output trains 15 and 16 of the second planetary gear stage 18 may also be formed by or connected to its sun gear and ring gear, respectively.

Advantageously, the first planetary gear stage 17 can be non-rotatably connected by its sun gear to the train branch 2.2 of the first unbalance trains 2 and, via its ring gear, to the trains branch 2.1 of the first unbalance trains 2.

The second planetary gear stage 18 may be coupled by its sun gear to the trains branch S1.1 of the second unbalance train 1, and by its ring gear to the string S1.2 of the second unbalance train 1.

Figure 4:
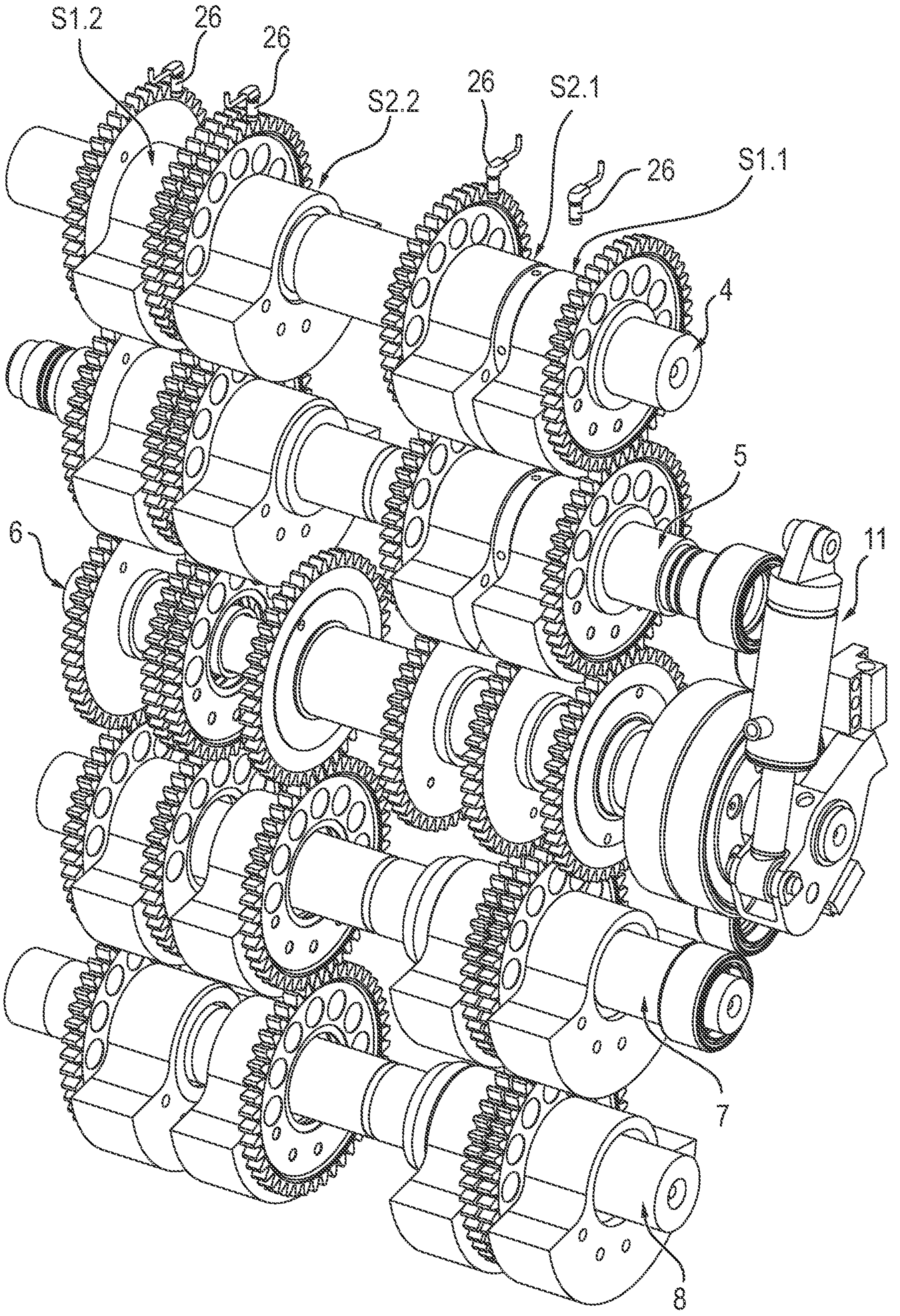
FIG. 4: a perspective rear view of the coaxially arranged unbalanced masses of the vibration generator of the preceding figures, wherein, as in FIG. 3, the braking device shown in FIGS. 1 and 2 has been omitted for clarity.

On the input side, the planetary gearing 12 may be connected to an adjustment drive 21 by which said common planet carrier 19 may be adjusted. Said adjustment drive 21 can, for example, be a hydraulic cylinder, as shown in FIG. 4, in order to be able to rotate or adjust the planet carrier 19 back and forth between two end positions. With appropriate control of the positioning drive 21, intermediate positions can also be approached if necessary.

By adjusting the planetary gearing 12, in particular its planet carrier 19, the unbalanced masses of the unbalance trains 1 and 2, more precisely their trains branches S1.1, S2.2, S2.1 and S1.1 can be adjusted relative to each other in their phase position in order to synchronize or compensate the generated unbalance forces with each other and/or to be able to make intermediate positions for adjusting the vibration force.

Advantageously, the unbalance trains 1 and 2, in particular their trains branches S1.2, S2.2, S2.1 and S1.1 can each be individually adjusted in their speeds, wherein in particular between the unbalance trains any rotational speed difference can be adjusted, preferably continuously, in order to adapt the vibration characteristic of the vibration generator 10 to the respective conditions, in particular soil conditions.

The rotation speed difference can be set in various ways. Advantageously, the drive apparatus 22 comprising said drive motors MS1.1, MS1.2, MS2.1 and MS2.2 may comprise a control apparatus 23 by means of which the speeds of said drive motors may be individually adjusted. In this regard, said control apparatus 23 may be configured as electronic to control the motor speed. Advantageously, the control apparatus 23 comprises a speed difference sensor 24, by means of which the desired speed difference between the respective unbalance trains can be set.

Advantageously, the control apparatus 23 can comprise a speed controller 25 for controlling the speeds of the said drive motors MS1.1, MS1.2, MS2.1 and MS2.2, which speed controller 25 controls the speed of the respective drive motor or of the unbalance group driven thereby as a function of an actual speed detected by sensors and a variably definable target speed. The actual speed can advantageously be detected by means of a non-contact speed sensor 26. Said speed sensors 26 may be, for example, non-contact proximity sensors which detect the cyclic approach of the unbalanced masses. Alternatively or additionally, however, differently configured speed sensors 26 may be provided which, for example, tactilely or contactlessly detect the speed of the associated spur gears which are connected to the unbalanced masses in a rotationally fixed manner. Alternatively or additionally, speed sensors can also be assigned to the drive motors themselves.

Alternatively or in addition to an adjustment of the rotation speed difference by corresponding control of the drive motors, a desired speed difference can also be adjusted by means of a braking device 27, which can advantageously comprise two braking units 28 and 29 for braking the first unbalance train 2 on the one hand and the second unbalance train 1 on the other hand. As shown in FIGS. 1 and 2, said braking device 27 may advantageously be arranged on the side of the planetary gearing 12 and/or may be combined with the planetary gearing 12 to form an assembly and/or may be interposed between the planetary gearing 12 and the exciter cell shafts.

As shown in FIGS. 1 and 2, on the one hand, the braking units 28 and 29 may each comprise a fixed assembly which may engage, for example, the planetary gear housing and/or the exciter cell housing. In this respect, a running brake assembly of the first brake unit 28 can brake the exciter cell shaft 5 and/or the drive motor MS2.1 and/or the unbalanced masses and/or the spur gears of the train branch S2.1 of the first unbalance train 2, while the running brake elements of the second brake unit 29 can brake the exciter cell shaft 4 and/or the motor MS1.1 and/or the unbalanced masses and/or the spur gears connected thereto of the trains branch S1.1 of the second unbalance trains 1, cf. FIGS. 1 and 2.

The braking device 27 is thereby controlled by said control apparatus 23 to set the desired rotation speed differences between the unbalance trains.

We claim:

1. A vibration generator for piling machines, compactors or other construction machines, comprising:

at least two or more unbalance trains, wherein each unbalance train comprises unbalanced masses rotatingly drivable by a drive apparatus, and an adjustment apparatus for adjusting a phase position of the unbalanced masses of each unbalance train relative to each other, wherein the unbalanced masses of different unbalance trains are arranged coaxially without a fixed transmission ratio relative to each other, wherein the unbalanced masses of a first unbalance train of the two or more unbalance trains are arranged between the unbalanced masses, coaxial therewith, of a second unbalance train of the two or more unbalance trains, and wherein the drive apparatus is configured to drive the unbalance trains with rotation speed differences which are variable relative to each other, and wherein the adjustment apparatus comprises a planetary gearing which comprises at least four output trains and an adjustment input train for adjusting the output trains relative to each other, wherein a first two of said output trains are connected to the relatively phase-adjustable unbalanced masses of the first unbalance train, and wherein a second two output trains are connected to the relatively phase-adjustable unbalanced masses of the second unbalanced train.

2. The vibration generator of claim 1, wherein the first unbalance train comprises two train branches, and wherein the unbalanced masses of the first unbalanced train are arranged in pairs, and wherein each of the unbalanced masses of the first unbalanced train is side-by-side with the other unbalanced mass of the respective pair and between the unbalanced masses of the second unbalance train which are coaxial thereto.

3. The vibration generator of claim 2, further comprising wherein the drive apparatus comprises at least four drive motors, wherein each drive motor is configured to drive only one train branch of the unbalance trains.

4. The vibration generator of claim 3, wherein the drive motors are on a common side of the vibration generator opposite the adjustment apparatus, and wherein each of the drive motors is on a different an exciter cell shaft.

5. The vibration generator of claim 1, wherein the drive apparatus comprises separate drive motors for each of the first and second unbalance trains.

6. The vibration generator of claim 5, wherein the drive apparatus comprises a control apparatus for controlling controls the speeds of said drive motors, and wherein the driver apparatus comprises an adjustable speed difference sensor for variably setting various rotational speed differences between the drive motors and between the unbalance trains driven thereby.

7. The vibration generator of claim 6, further comprising wherein the control apparatus has one or more speed controllers for regulating the speeds of the drive motors as a function of a sensed actual speed and a variably definable target speed.

8. The vibration generator of claim 1, further comprising wherein the drive apparatus comprises one or more drive motors, wherein each drive motor is configured to drive a plurality of the unbalanced masses, and wherein the unbalanced masses are seated on different one or more exciter cell shafts.

9. The vibration generator of claim 1, further comprising speed sensors for detecting the actual speeds of the unbalanced masses of each a train branch of the unbalance trains, wherein the speed sensors comprise proximity sensors operating without contact.

10. The vibration generator of claim 1, further comprising a braking device for braking at least one unbalance train for adjusting a speed difference and/or a phase offset between the unbalance trains.

11. The vibration generator of claim 10, wherein the braking device comprises a first and a second braking unit, wherein the first braking unit is configured for braking the first unbalance train, and wherein the second braking unit is configured for braking the second unbalance train.

12. The vibration generator of claim 11, wherein the braking device is configured to be actuated by a control device as a function of the detected actual speeds of the unbalance trains and definable desired speeds of the unbalance trains.

13. The vibration generator of claim 10, wherein the braking device is configured to be actuated by a control device as a function of the detected actual speeds of the unbalance trains and definable desired speeds of the unbalance trains.

14. The vibration generator of claim 10, wherein the braking device and the adjustment apparatus are on a common side of the vibration generator opposite drive motors.

15. The vibration generator of claim 1, wherein the at least four output trains extend from a common multi-stage planet carrier adjustably formed by the adjusting input train.

16. The vibration generator of claim 15, wherein the phase-adjustable unbalanced masses of the first unbalance train are connected to a sun gear and to a ring gear of a first planetary gear stage, and wherein the phase-adjustable unbalanced masses of the second unbalance train are connected to a sun gear and a ring gear of a second planetary gear stage, wherein the first and second planetary gear stages are connected by the common multi-stage adjustable planet carrier.

17. The vibration generator of claim 1, wherein the phase-adjustable unbalanced masses of the first unbalance train are connected to a sun gear and to a ring gear of a first planetary gear stage, and wherein the phase-adjustable unbalanced masses of the second unbalance train are connected to a sun gear and a ring gear of a second planetary gear stage, wherein the first and second planetary gear stages are connected by a common, two-stage, adjustable planet carrier.

18. The vibration generator of claim 1, wherein the adjustment apparatus comprises an adjustment drive comprising a pressure medium cylinder for adjusting the planet carrier of the planetary gear between two end positions.

19. The vibration generator of claim 1, wherein the unbalanced masses are distributed over a plurality of exciter cell shafts in a common upright plane.

20. A construction machine comprising a vibrator and/or piling machine, wherein the construction machine comprises the vibration generator of claim 1.

* * * * *